US007275369B2

(12) United States Patent
Kim

(10) Patent No.: US 7,275,369 B2
(45) Date of Patent: Oct. 2, 2007

(54) HYDRAULIC CONTROL DEVICE FOR CONTROLLING A BOOM-SWING FRAME COMBINED MOTION IN AN EXCAVATOR

(75) Inventor: Yong Chae Kim, Incheon (KR)

(73) Assignee: Doosan Infracore Co., Ltd., Incheon (KR)

( * ) Notice: Subject to any disclaimer, the term of this patent is extended or adjusted under 35 U.S.C. 154(b) by 61 days.

(21) Appl. No.: 11/315,420

(22) Filed: Dec. 21, 2005

(65) Prior Publication Data

US 2006/0130473 A1 Jun. 22, 2006

(30) Foreign Application Priority Data

Dec. 22, 2004 (KR) ..................... 10-2004-0110414

(51) Int. Cl.
*F15B 13/02* (2006.01)
*F16D 31/02* (2006.01)

(52) U.S. Cl. ............................ 60/422; 60/430; 91/448

(58) Field of Classification Search .................. 60/422, 60/426, 429, 430; 91/448, 516
See application file for complete search history.

(56) References Cited

U.S. PATENT DOCUMENTS 5,673,558 A * 10/1997 Sugiyama et al. ............ 60/426
5,692,377 A * 12/1997 Moriya et al. ................ 60/430
5,930,996 A * 8/1999 Nakamura et al. ............ 60/426
5,970,709 A * 10/1999 Tohji ........................... 60/429

* cited by examiner

*Primary Examiner*—Michael Leslie
(74) *Attorney, Agent, or Firm*—Lee, Hong, Degerman, Kang & Schmadeka

(57) ABSTRACT

A hydraulic control device includes first and second pumps, a swing control spool, a boom first-speed control spool, a boom second-speed control spool, a swing motor, a boom cylinder, a pilot control valve, and a confluence line for merging the hydraulic flow from the boom second-speed control spool with that from the boom first-speed control spool. Provided on the confluence line is a swing priority valve having an orifice for variably reducing the hydraulic flow supplied to the boom cylinder through the confluence line. A swing priority control line is provided to interconnect a pressure receiving part of the swing priority valve and a swing control pilot pressure signal line of the pilot control valve in such a manner that an aperture area of the variable orifice of the swing priority valve is reduced in proportion to the magnitude of a swing control pilot pressure of the pilot control valve.

4 Claims, 5 Drawing Sheets

HYDRAULIC CONTROL DEVICE FOR CONTROLLING A BOOM-SWING FRAME COMBINED MOTION IN AN EXCAVATOR

This application claims the benefit of the Korean Patent Application No. 10-2004-0110414, filed on Dec. 22, 2004, which is hereby incorporated by reference as if fully set forth herein.

BACKGROUND OF THE INVENTION

1. Field of the Invention

The present invention is directed to a hydraulic control device for controlling composite operations of an excavator and, more specifically, to a hydraulic control device for controlling a boom-swing frame combined motion that increases a swing torque to facilitate the swing motion of a swing frame when an excavator performs composite operations such as a loading-on-truck operation, a ground leveling operation and the like through the combined motion of a boom and a swing frame.

2. Description of the Related Art

Hydraulic excavators are provided with front operation components including a boom, an arm and a bucket, which components can be actuated independently or in combination by a hydraulic flow discharged from one or more fluid pump to conduct a variety of composite operations such as a digging operation, a ground leveling operation, a loading-on-truck operation and the like. As used herein, the term “composite operations” refers to excavator operations that are performed by simultaneous actuation of two or more of a boom cylinder, an arm cylinder and a swing motor.

As is known in the art, the conventional hydraulic excavators include a hydraulic control device. The hydraulic control device is provided with a control valve having boom first-speed and second-speed control spools and arm first-speed and second-speed control spools that can be shifted to cause a boom and an arm to move at a relatively low speed (“first speed”) or a relatively high speed (“second speed”) depending on the kind of operations to be carried out.

The boom second-speed control spool and the arm first-speed control spool, which belong to a first spool group, are in fluid communication with a primary fluid pump, while the boom first-speed control spool and the arm second-speed control spool, which belong to a second spool group, are in fluid communication with a secondary fluid pump. The hydraulic flow generated by only one of the fluid pumps is used in actuating a boom cylinder or an arm cylinder at the first speed. On the contrary, the hydraulic flows generated by the primary pump and the secondary pump are combined together in order to actuate the boom cylinder or the arm cylinder at the second speed.

More specifically, referring to FIG. 1, the prior art hydraulic control device is provided with a first fluid pump P1 and a second fluid pump P2 each for generating a hydraulic flow to be used in the hydraulic control device. The hydraulic control device is further provided with a control valve 100 for controlling the hydraulic flows of the first and second fluid pumps P1, P2 supplied to the boom cylinder 105 and the arm cylinder 107. The control valve 100 includes a first control spool group 100A consisting of a boom second-speed control spool 101B and an arm first-speed control spool 103A, and a second control spool group 100B consisting of a boom first-speed control spool 101A and an arm second-speed control spool 103B. Also included in the first spool group 100A is a swing control spool 109 for controlling actuation of a swing motor 120.

In other words, the swing control spool 109, the boom second-speed control spool 101B and the arm first-speed control spool 103A are respectively provided on a first bypass line 110 from upstream to downstream in the named sequence for receiving the hydraulic flow from the first pump P1 via parallel lines 111, 112, 113. The boom first-speed control spool 101A and the arm second-speed control spool 103B are respectively provided on a second bypass line 115 from upstream to downstream in the named sequence for receiving the hydraulic flow from the second pump P2 via the parallel lines 116, 117.

Referring again to FIG. 1, the hydraulic flow of the first fluid pump P1 is distributed to the swing control spool 109 and the boom second-speed control spool 101B to thereby actuate the swing motor 120 and the boom cylinder 105 at the second speed. and The boom second-speed control spool 101B and the boom first-speed control spool 101A are connected to the boom cylinder 105 via a confluence line 112 so that the hydraulic flow of the first fluid pump P1 and the hydraulic flow of the second fluid pump P2 can be merged together in the confluence line 112 after passing through the boom second-speed control spool 101B and the boom first-speed control spool 101A, respectively. A check valve 123 is disposed on the confluence line 112 in such a manner that the check valve 123 allows the hydraulic flows passed the boom second-speed control spool 101B to be supplied to the boom cylinder 105 through the confluence line 112 but prevents the hydraulic flow passed the boom first-speed control spool 101A from flowing toward the boom second-speed control spool 101B.

In this type of hydraulic control device, the swing actuation pressure is greater than the boom actuation pressure at an initial stage of the boom-swing frame combined motion during which the boom cylinder 105 and the swing motor 120 are actuated simultaneously. This causes the hydraulic flow of the first fluid pump P1 to be first supplied to the boom cylinder 105, thus balancing the actuation pressure of the boom cylinder 105 with that of the swing motor 120.

The swing motor 120 is associated with a relief valve 125 that serves to limit the pressure of the hydraulic flow supplied to the swing motor to below a predetermined value. In case that a swing frame alone is caused to move by the swing motor 120 with other operating components left inoperative, the swing actuation pressure is increased up to a relief pressure of the relief valve 125 as illustrated by a line A1 in FIG. 2*a* and therefore the swing torque is also maximized as illustrated by a line A2 in FIG. 2*b*, thus enabling the swing operation to take place in a smooth manner.

In case of a boom-swing frame combined motion, however, the swing actuation pressure does not soar up to the maximum value but remains equal to the boom actuation pressure as indicated by a line B1 in FIG. 2*a*, which means that the swing torque fails to reach the maximum value as indicated by a line B2 in FIG. 2*b*. This makes it difficult to move the swing frame which requires greater torque than the boom during the course of boom-swing frame composite operations.

SUMMARY OF THE INVENTION

In view of the afore-mentioned and other problems inherent in the prior art hydraulic control devices, it is an object of the present invention to provide a hydraulic control device for controlling a boom-swing frame combined motion in an excavator that can increase a swing pressure up to a predetermined swing relief pressure to thereby facilitate the movement of a swing frame, in case of conducting composite operations such as a loading-on-truck operation, a ground leveling operation and the like on a sloping ground.

With this object in view, the present invention provides a hydraulic control device for controlling a boom-swing frame combined motion in an excavator, comprising first and second fluid pumps, a swing control spool and a boom second-speed control spool respectively provided on parallel lines for receiving a hydraulic flow from the first pump via the parallel lines, a boom first-speed control spool for receiving a hydraulic flow from the second pump, a swing motor actuated by the hydraulic flow supplied from the first pump through the swing control spool, a boom cylinder actuated by the hydraulic flows supplied from the first and second pumps through the boom second-speed control spool and the boom first-speed control spool, a pilot control valve for providing a pilot pressure to displace the swing control spool, the boom first-speed control spool and the boom second-speed control spool, and a confluence line for merging the hydraulic flow from the boom second-speed control spool with that from the boom first-speed control spool, characterized by further comprising: a swing priority valve provided on the confluence line and having a variable orifice for variably reducing the hydraulic flow supplied to the boom cylinder through the confluence line; and a swing priority control line interconnecting a pressure receiving part of the swing priority valve and a swing control pilot pressure signal line of the pilot control valve in such a manner that an aperture area of the variable orifice of the swing priority valve is reduced in proportion to the magnitude of a swing control pilot pressure of the pilot control valve.

In a preferred embodiment of the present invention, it is desirable that the variable orifice of the swing priority valve comprise a variable throttling section for reducing the aperture area in proportion to the magnitude of a swing control pilot pressure in the swing priority control line and a bleed-off section formed contiguous to the variable throttling section for keeping the aperture area constant.

In a preferred embodiment of the present invention, it is also desirable that the hydraulic control device further comprise a selection switch and a selection valve provided on the swing priority control line for selectively opening and shutting off the swing priority control line in response to activation and deactivation of the selection switch.

According to the present invention summarized above, if there exists a need to make greater a swing actuation pressure than a boom actuation pressure during the course of boom-swing frame combined motion, for example, if an excavator performs a loading-on-truck operation on a sloping ground through a simultaneous movement of a boom and a swing frame, the operator can activate or turn on a selection switch to increase the swing actuation pressure or swing torque to a maximum value particularly at an initial of the boom-swing frame combined motion, thus facilitating the loading-on-truck operation on the sloping ground. Meanwhile, in case of conducting the boom-swing frame combined motion on a level ground, the selection switch is deactivated or turned off so that the boom motion and the swing frame motion can be controlled depending on the actuation pressures applied to a boom cylinder and a swing motor without resort to the swing priority control noted above.

BRIEF DESCRIPTION OF THE DRAWINGS

The above and other objects, features and advantages of the present invention will become apparent from the following description of a preferred embodiment given in conjunction with the accompanying drawings, in which.

DETAILED DESCRIPTION OF THE INVENTION

A preferred embodiment of a hydraulic control device for controlling a boom-swing frame combined motion in an excavator according to the present invention will now be described in detail with reference to the accompanying drawings.

Figure 1:
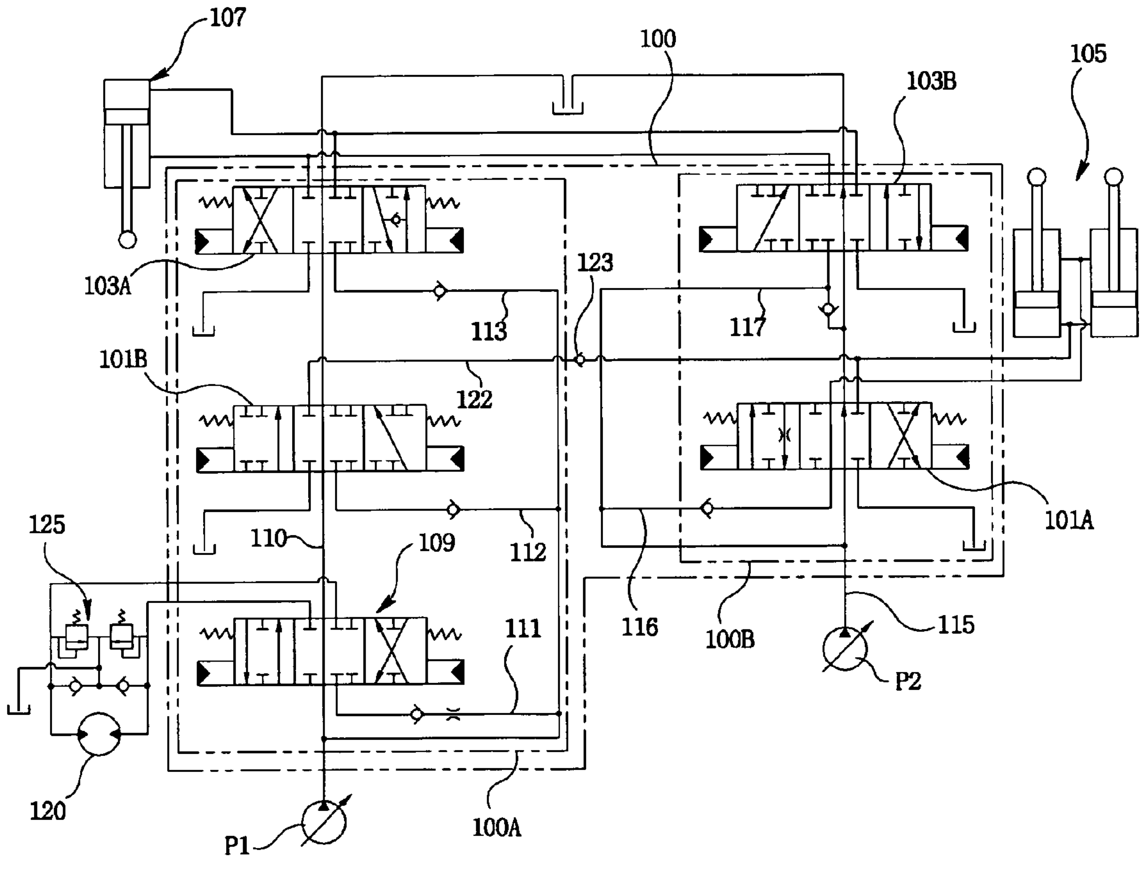
FIG. 1 (PRIOR ART)
FIG. 1 schematically shows a fluid pressure circuit employed in a prior art hydraulic control device for conducting a boom-swing frame combined motion in an excavator.
Figure 2A:
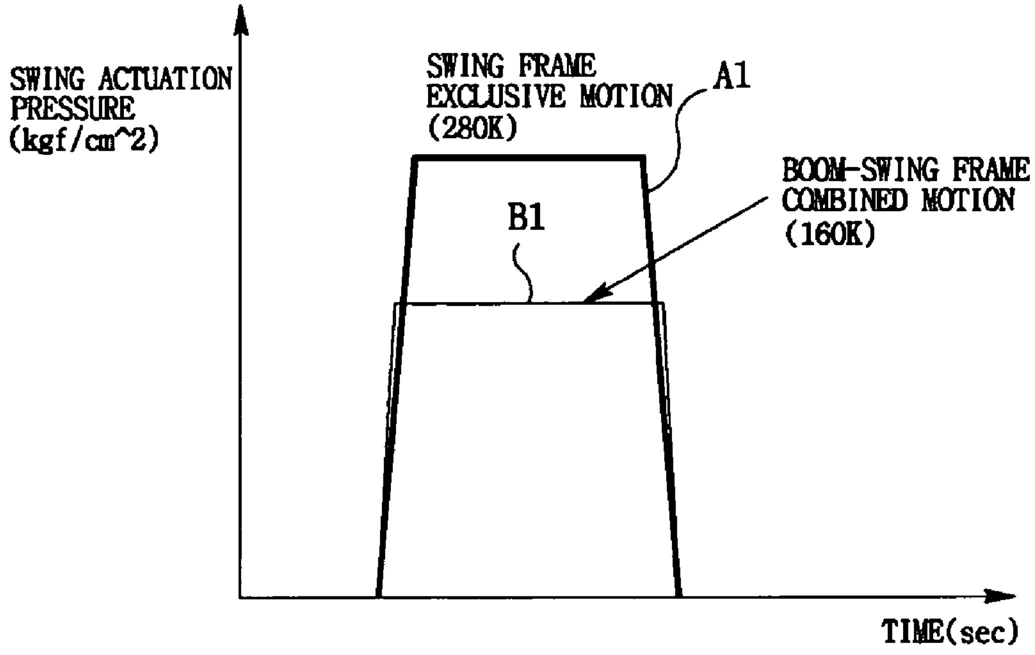
FIG. 2A (PRIOR ART)
FIG. 2*a* is a graphical representation illustrating the variation of swing actuation pressures in case of a swing frame-exclusive motion and a boom-swing frame combined motion.
Figure 2B:
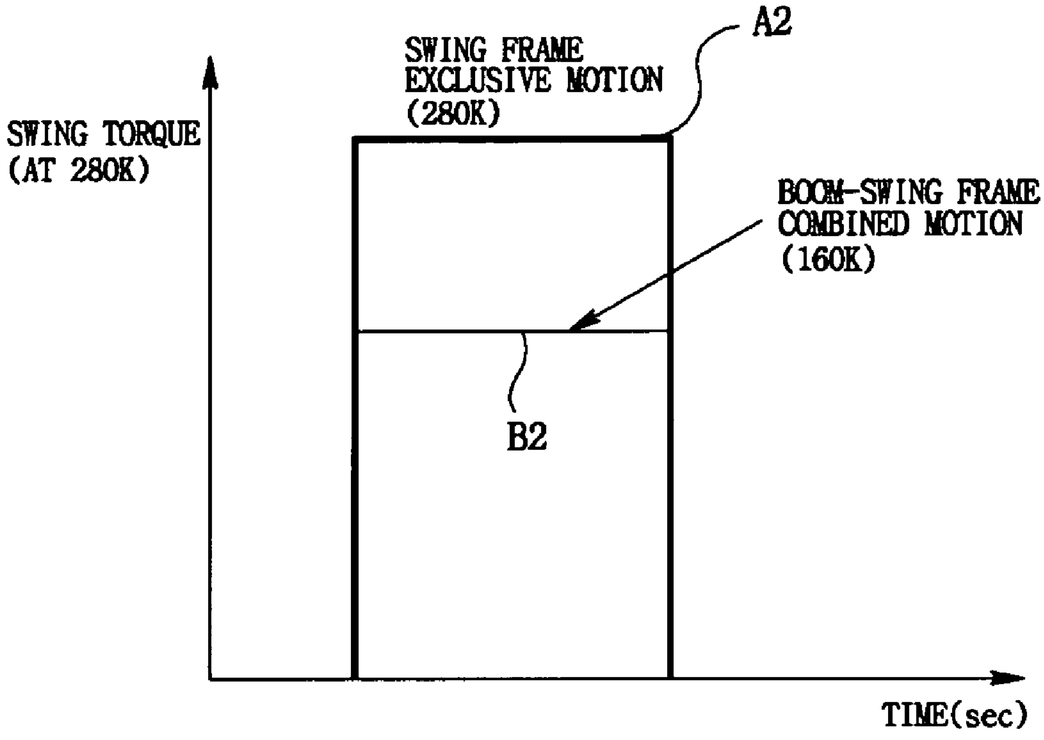
FIG. 2B (PRIOR ART)
FIG. 2*b* is a graphical representation illustrating the variation of swing torques in case of a swing frame-exclusive motion and a boom-swing frame combined motion.
Figure 3:
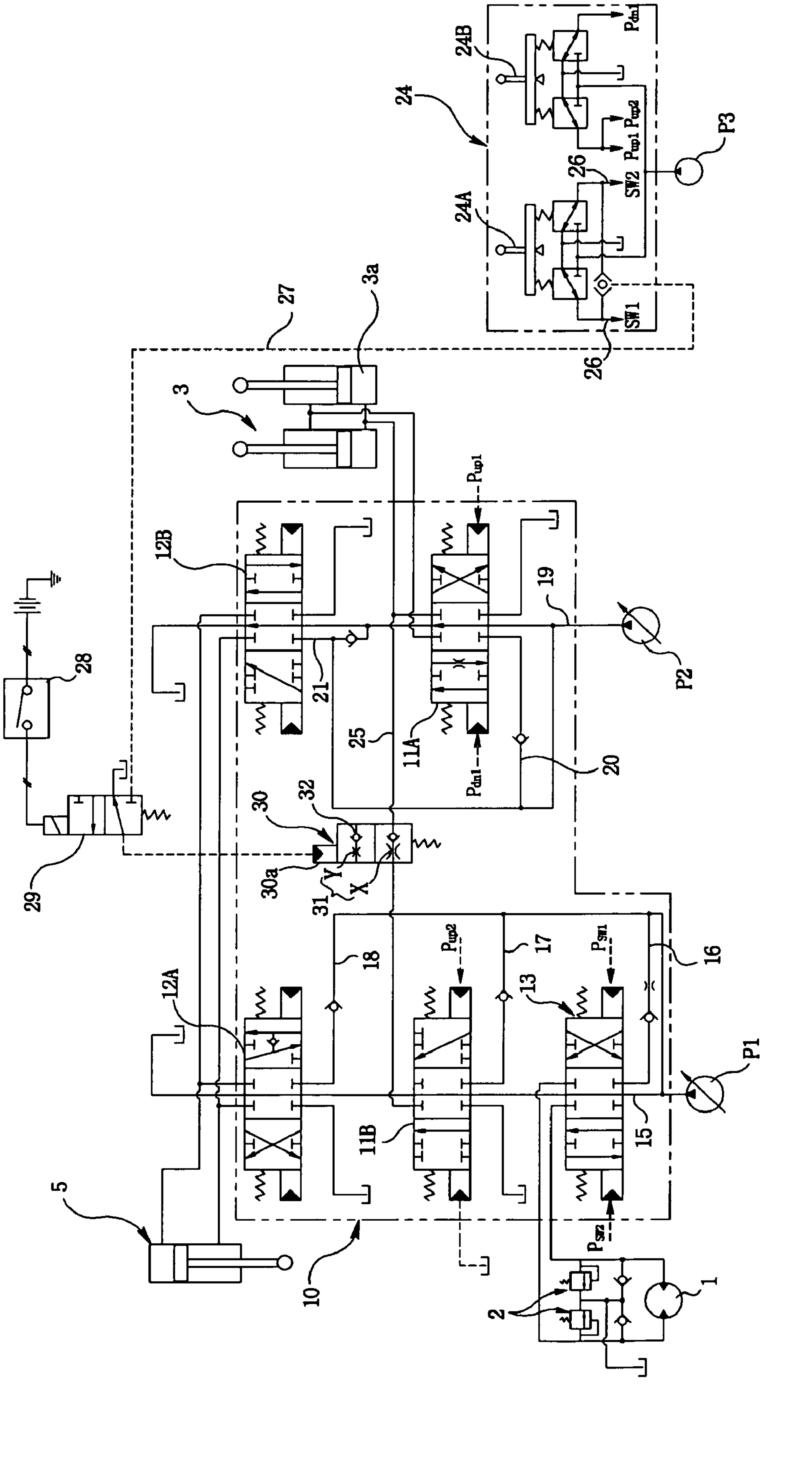
FIG. 3 schematically shows a fluid pressure circuit employed in a hydraulic control device of the present invention for conducting a boom-swing frame combined motion in an excavator.
Figure 4:
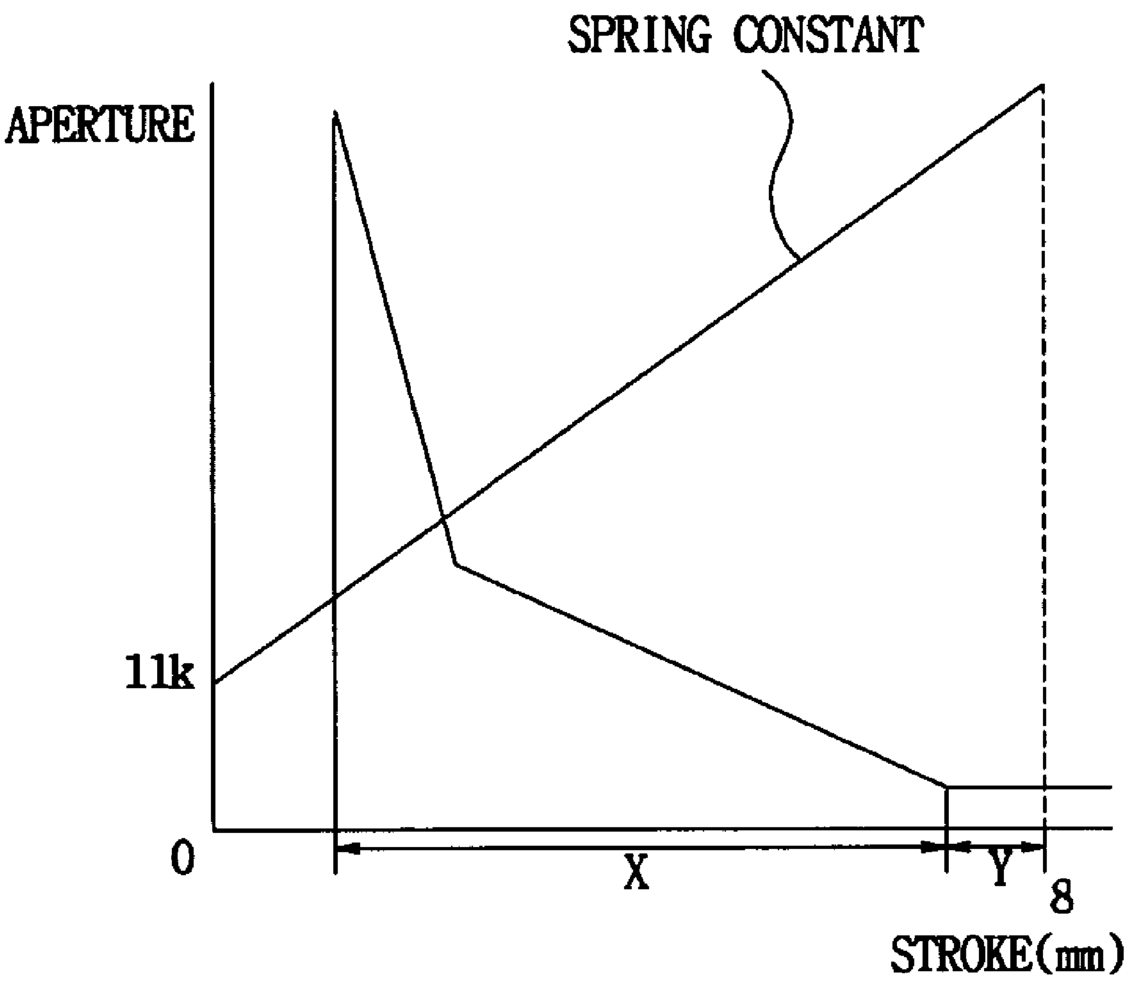
FIG. 4 is a graphical representation illustrating the correlation of a stroke and an aperture area of a swing priority valve incorporated in the hydraulic control device of the present invention.

FIG. 3 is a schematic diagram showing one embodiment of a hydraulic control device of the present invention. As shown in FIG. 3, the hydraulic control device of the present invention is provided with a first fluid pump P1 and a second fluid pump P2 each for generating a hydraulic flow to be used in the hydraulic control device. The hydraulic flows discharged from the first and second fluid pumps P1, P2 are direction-controlled by a control valve 10 and then distributed to a variety of hydraulic actuators, such as a swing motor 1, a boom cylinder 3 and an arm cylinder 5, to actuate them in a controlled manner. A swing relief valve 2 is disposed on a fluid pressure line that interconnects the swing motor 1 and the first fluid pump P1.

The control valve 10 includes a swing control spool 13 for controlling actuation of the swing motor 1, a boom first-speed control spool 11A for actuating the boom cylinder 3 at a relatively low speed ("first speed"), a boom second-speed control spool 11B for actuating the boom cylinder 3 at a relatively high speed ("second speed"), an arm first-speed control spool 12A for actuating the arm cylinder 5 at a first speed, and an arm second-speed control spool 12B for actuating the arm cylinder 5 at a second speed.

The swing control spool 13, the boom second-speed control spool 11B and the arm first-speed control spool 12A are disposed on a first bypass line 15 from upstream to downstream in the named sequence and connected to the first fluid pump P1 through parallel lines 16, 17, 18. Normally, the hydraulic flow of the first fluid pump P1 is drained to a tank via the first bypass line 15.

The boom first-speed control spool 11A and the arm second-speed control spool 12B are disposed on a second bypass line 19 from upstream to downstream in the named sequence and connected to the second fluid pump P2 through parallel lines 20, 21. Normally, the hydraulic flow of the second fluid pump P2 is drained to a tank via the second bypass line 19.

Outlet ports of the boom second-speed control spool 11B and the boom first-speed control spool 11A are connected in common to a confluence line 25 and kept in fluid communication with the boom cylinder 3 through the confluence line 25.

A pilot control valve 24 is provided to, under the control of a manipulation lever 24*a*, reduce the pressure of a hydraulic flow discharged by a pilot pump P3 and then provide pilot pressure signals to each of the control spools 11A, 11B, 12A, 12B, 13.

If the pilot control valve 24 issues a boom first-speed control signal and a boom second-speed control signal at one time for the purpose of actuating the boom cylinder 3 at the second speed, the boom first-speed control spool 11A and the boom second-speed control spool 11B are shifted to the left when viewed in FIG. 3. This assures that the hydraulic flow of the first fluid pump P1 and the hydraulic flow of the second fluid pump P2 pass respectively through the boom second-speed control spool 11B and boom first-speed control spool 11A and are merged together in the confluence line 25, after which the hydraulic flows thus merged are supplied to the boom cylinder 3 so as to actuate it at the second speed.

A swing priority valve 30 is provided on the confluence line 25 for variably reducing the hydraulic flow supplied to the boom cylinder 3 through the confluence line 25 in proportion to the magnitude of a swing control pilot pressure provided from the pilot control valve 24.

The swing priority valve 30 has a pressure receiving part 30*a*, a variable orifice 31 and a check valve 32. The pressure receiving part 30*a* of the swing priority valve 30 is connected to the pilot control valve 24 via a swing priority control line 27 and a swing control signal line 26 so that it can receive a swing control signal pressure from the pilot control valve 24.

The variable orifice 31 of the swing priority valve 30 has a variable throttling section (X) for reducing its aperture area in proportion to the magnitude of a swing control pilot pressure in the swing priority control line 27 and a bleed-off section (Y) formed contiguous to the variable throttling section (X) for keeping its aperture area constant.

Accordingly, if the pilot control valve 24 is manipulated and generates a swing control signal pressure to cause a swing frame-exclusive motion or a boom-swing frame combined motion, the swing control signal pressure acts on the swing control spool 13 of the control valve 10 and, at the same time, on the pressure receiving part 30*a* of the swing priority valve 30 through the swing priority control line 27.

As a swing manipulation lever 24A of the pilot control valve 24 is manipulated to a greater extent, an increased magnitude of swing control signal pressures SW1, SW2 are applied to the pressure receiving part 30*a* of the swing priority valve 30 through swing priority control line 27, in response to which the swing priority valve 30 is shifted to a position where the aperture area of the variable orifice 31 is reduced. This reduces the hydraulic flow of the first fluid pump P1 that is to be merged in the confluence line 25 with the hydraulic flow of the second fluid pump P2. Accordingly, the hydraulic flow supplied to the swing motor 1 through the swing control spool 13 is proportionally increased, whereby the swing actuation pressure becomes greater than the boom actuation pressure, thereby causing the swing motor 1 and the swing frame associated therewith to move faster.

It should be appreciated that the swing priority valve 30 is normally biased upwards by a spring in such a manner that a specific part of the variable throttling section (X) is in alignment with the swing priority control signal line 27. If the swing priority control signal pressure is delivered to the pressure receiving part 30*a* through the swing priority control signal line 27, the swing priority valve 30 is displaced against the biasing force of the spring in such a manner that the bleed-off section (Y) comes into alignment with the swing priority control signal line 27. The spring for resiliently biasing the swing priority valve 30 in this manner has a spring constant as shown in FIG. 3. As can be seen in FIG. 3, in the variable throttling section (X), the aperture area of the swing priority valve 30 is sharply reduced at an initial stage and then gently decreased as the stroke of the swing priority valve 30 becomes greater. However, in the bleed-off section (Y), the aperture area of the swing priority valve 30 is minimized and then kept constant regardless of the stroke of the swing priority valve 30.

A selection valve 29 is provided on the swing priority control line 27 for selectively opening and shutting off the swing priority control line 27 in response to activation and deactivation of a selection switch 28 electrically associated with the selection valve 29.

If the operator activates the selection switch 28 to conduct a swing priority control operation, the selection valve 29 comes to open the swing priority control line 27 thus making the swing priority control available. On the contrary, if the selection switch 28 is deactivated to cause the boom-swing frame combined motion, the selection valve 29 will shut off the swing priority control line 27 thus rendering the swing priority control function dead. This allows the boom cylinder 3 and the swing motor 1 to be actuated by the normally applied actuation pressures.

Operation of the hydraulic control device according to the present invention will now be set forth in greater detail.

If the operator wishes to simultaneously operate the boom and the swing frame for the sake of performing, e.g., a loading-on-truck operation on a sloping ground, the selection switch 28 is turned on to thereby open the swing priority control line 27. Then, the swing manipulation lever 24A and the boom manipulation lever 24B of the pilot control valve 24 are manipulated at one time to have the pilot control valve 24 generate a swing control signal pressure and a boom control signal pressure.

The swing control signal pressure thus generated shifts the swing control valve 13 to the left or right so that the swing motor 1 can be rotated in a forward or reverse direction by the action of the hydraulic flow supplied from the first fluid pump P1. Concurrently, the swing control signal pressure is delivered to the pressure receiving part 30*a* of the swing priority valve 30 through the swing priority control line 27 to thereby shift the swing priority valve 30 downwards when viewed in FIG. 3. This enables the variable orifice 31 of the swing priority valve 30 to reduce the hydraulic flow of the first fluid pump P1 to be merged in the confluence line 25 with the hydraulic flow of the second fluid pump P2.

As described in the foregoing, according to the hydraulic control device of the present invention, the swing priority valve is adapted to automatically increase or decrease the moving speed of the swing frame in proportion to the magnitude of the swing control signal pressure generated by the pilot control valve, i.e., the degree of manipulation of the pilot control valve. This permits the operator to control the boom-swing frame combined motion in a convenient fashion and helps to improve the performance of the swing operation requiring greater torque than the boom operation, particularly in case of performing a loading-on-truck operation on a sloping ground by virtue of the boom-swing frame combined motion.

Although a preferred embodiment of the present invention has been described herein above, it will be apparent to those skilled in the art that various changes or modifications may be made thereto within the scope of the invention defined by the appended claims.

What is claimed is:

1. A hydraulic control device for controlling a boom-swing frame combined motion in an excavator, comprising first and second fluid pumps (P1, P2), a swing control spool (13) and a boom second-speed control spool (11B) respectively provided on parallel lines (16, 17) for receiving a hydraulic flow from the first pump (P1) via the parallel lines (16, 17), a boom first-speed control spool (11A) for receiving a hydraulic flow from the second pump (P2), a swing motor (1) actuated by the hydraulic flow supplied from the first pump (P1) through the swing control spool (13), a boom cylinder (3) actuated by the hydraulic flows supplied from the first and second pumps (P1, P2) through the boom second-speed control spool (11B) and the boom first-speed control spool (11A), a pilot control valve (24) for providing a pilot pressure to displace the swing control spool (13), the boom first-speed control spool (11A) and the boom second-speed control spool (11B), and a confluence line (25) for merging the hydraulic flow from the boom second-speed control spool (11B) with that from the boom first-speed control spool (11A), characterized by further comprising:

a swing priority valve (30) provided on the confluence line (25) and having a variable orifice (31) for variably reducing the hydraulic flow supplied to the boom cylinder (3) through the confluence line (25); and a swing priority control line (27) interconnecting a pressure receiving part of the swing priority valve (30) and a swing control pilot pressure signal line of the pilot control valve (24) in such a manner that an aperture area of the variable orifice (31) of the swing priority valve (30) is reduced in proportion to the magnitude of a swing control pilot pressure of the pilot control valve (24).

2. The hydraulic control device as recited in claim 1, wherein the variable orifice (31) of the swing priority valve (30) comprises a variable throttling section (X) for reducing the aperture area in proportion to the magnitude of a swing control pilot pressure in the swing priority control line (27) and a bleed-off section (Y) formed contiguous to the variable throttling section (X) for keeping the aperture area constant.

3. The hydraulic control device as recited in claim 1, further comprising a selection switch (28) and a selection valve (29) provided on the swing priority control line (27) for selectively opening and shutting off the swing priority control line (27) in response to activation and deactivation of the selection switch (28).

4. The hydraulic control device as recited in claim 2, further comprising a selection switch (28) and a selection valve (29) provided on the swing priority control line (27) for selectively opening and shutting off the swing priority control line (27) in response to activation and deactivation of the selection switch (28).

* * * * *